United States Patent

[11] 3,569,606

| [72] | Inventor | Michel Clin |
| --- | --- | --- |
| | | Rueil Malmaison (Hauts De Seine), France |
| [21] | Appl. No. | 765,312 |
| [22] | Filed | Oct. 7, 1968 |
| [45] | Patented | Mar. 9, 1971 |
| [73] | Assignee | L'Electro Entreprise, S.A. |
| | | Paris, France |
| [32] | Priority | Oct. 19, 1967 |
| [33] | | France |
| [31] | | 125 023 |

[54] ELECTRICAL CONNECTING DEVICE
25 Claims, 11 Drawing Figs.

[52] U.S. Cl. .................................................. 174/16,
174/13, 174/19, 174/21, 174/28, 174/99
[51] Int. Cl. .................................................... H01b 9/04
[50] Field of Search .......................................... 174/28, 29,
99 (B), 99 (E), 88 (B), 68 (B), 69, 70 (B), 71 (B),
71 (C), 88.2, 84, 16, 16 (B), 21, 21.3, 21.4, 13, 15
(C)

[56] References Cited
UNITED STATES PATENTS

| 2,298,428 | 10/1942 | Smith | 174/28X |
| --- | --- | --- | --- |
| 2,664,456 | 12/1953 | Schymik | 174/99(B) |
| 2,783,299 | 2/1957 | Schymik | 174/99(B) |
| 3,061,665 | 10/1962 | Rugg et al. | 174/99X |
| 3,221,097 | 11/1965 | Cognet | 174/99 |
| 3,391,243 | 7/1968 | Whitehead | 174/28 |

Primary Examiner—Laramie E. Askin
Assistant Examiner—A. T. Grimley
Attorney—Edwin E. Greigg ABSTRACT: An electric power installation has connection between units such as an alternator and transformer, made by hollow, cylindrical phase conductors of different diameters which are coaxially aligned. The cylinders are enclosed by an outer sheath, the conductors and sheath being isolated from one another by a fluid insulant and held spaced apart by insulators having corrugated surfaces to provide long leakage paths. Each insulator extends between the sheath and inner conductor and is withdrawable through a port in the sheath. The conductors are in joined sections which may include expansion joints.

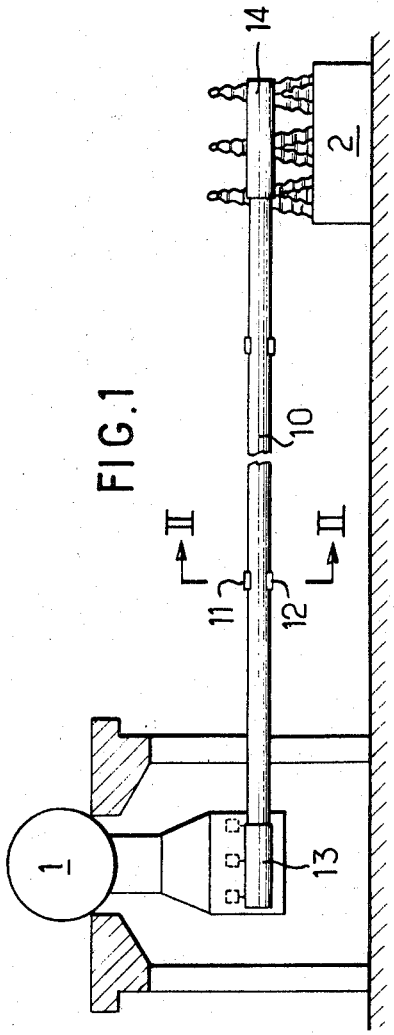
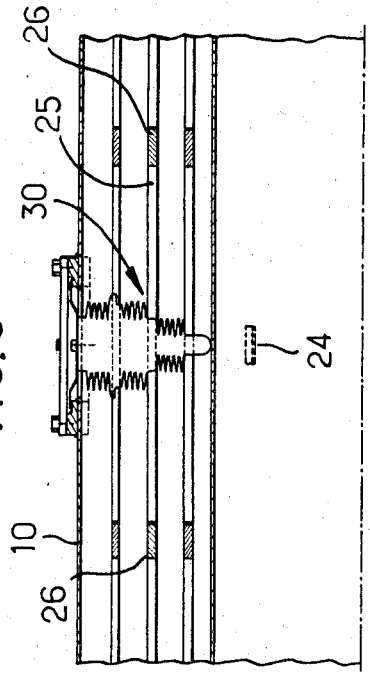
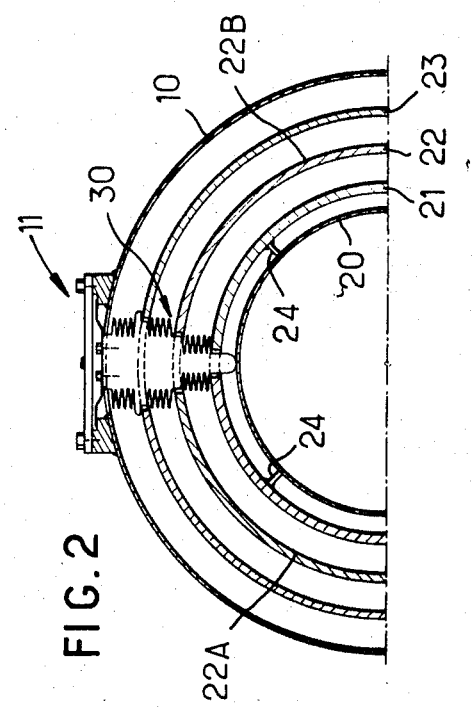

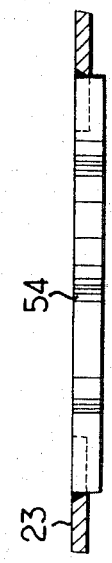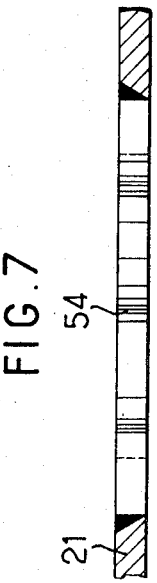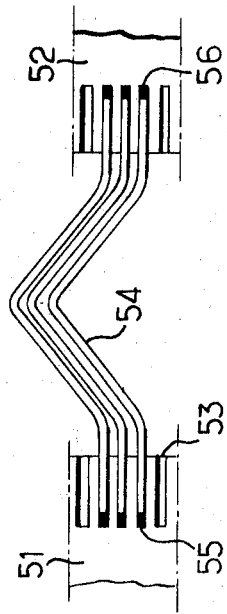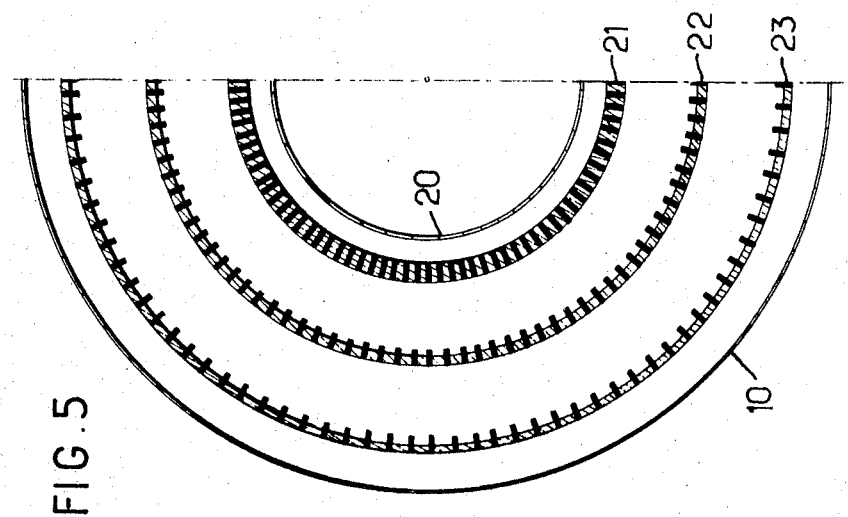

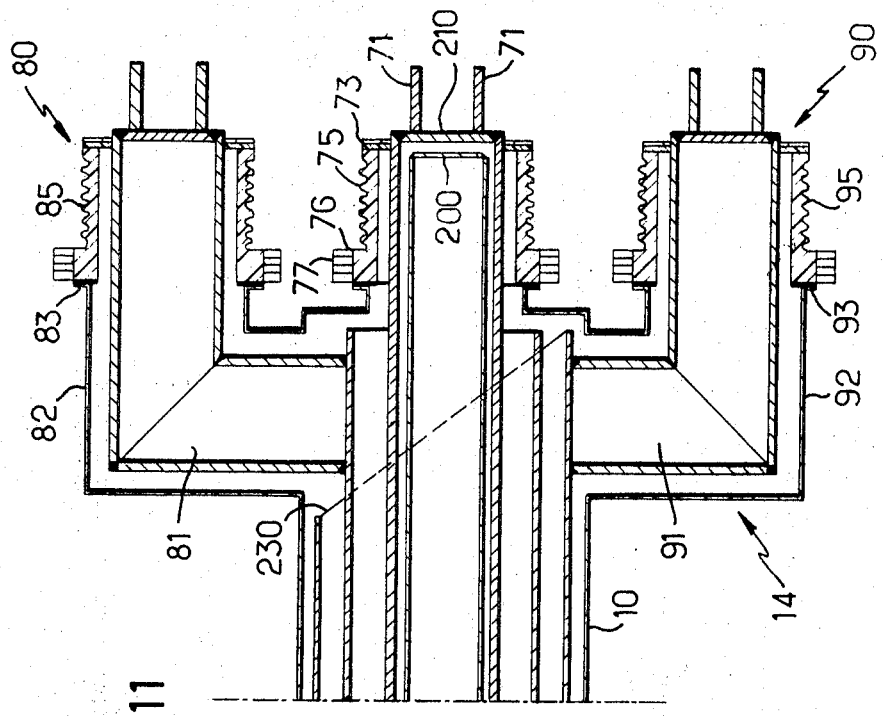
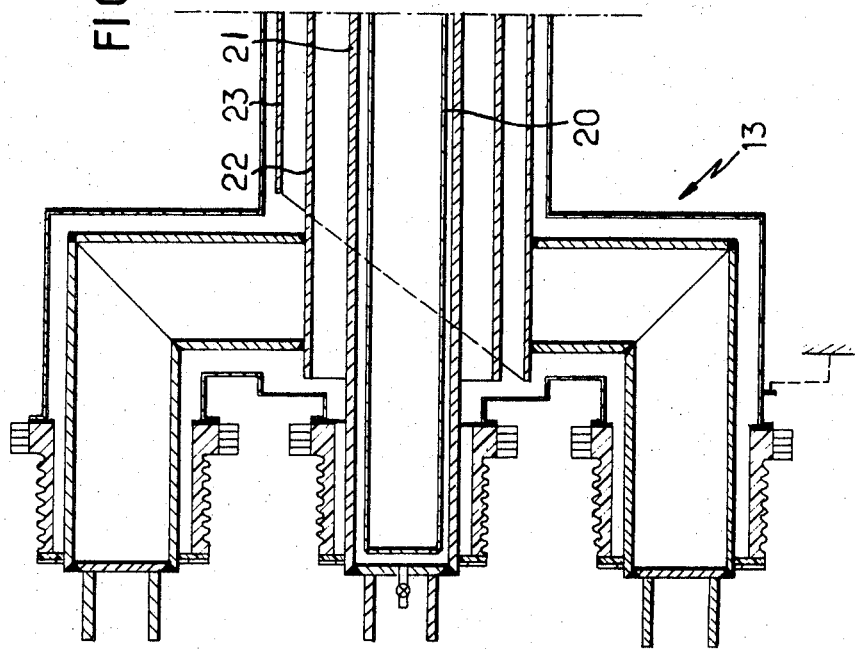
FIG.11

ELECTRICAL CONNECTING DEVICE

The present invention relates to an electrical connecting device and to a coupling arrangement using same. The invention further relates to an electrical power installation in which such a coupling arrangement is used.

The invention finds particular application in electric powerstations for providing connections between alternators on the one hand and output transformers on the other hand. The connections may have taps therefrom in order to feed, for example, ancillary equipment such as auxiliary transformers or banks of capacitors for power-factor correction. Further, the connectors may be interrupted by circuit breakers or other isolating appliances.

Connections of this kind at present in use are generally of the so-called coaxial type comprising conductors of tubular construction each disposed on the axis of an associated sheath constituting a magnetic screen. In these connections, which are so-called "short circuit" type connections, reverse currents of the same order as the currents flowing in the conductors themselves flow through the sheaths when in operation, so that resistive heat losses occur in the latter and represent a considerable part of the total losses in the connection.

Moreover, when a short circuit occurs the electrodynamic forces tending to move the conductors towards or away from one another may assume considerable values, thus making it necessary to provide heavy and clumsy supporting structures.

It is preferred to make use of a coaxial arrangement for the phase conductors of the coupling arrangement. This takes the form of hollow cylinders fitted into one another with the interposition of annular layers of insulation.

Such an arrangement for the conductors has already been proposed in the field of panel installations (German Pat. No. 688,878) or for making vertical pillars in fixed installations (French Pat No. 944,565). Nevertheless, these prior embodiments do not lend themselves to carrying large amounts of current. The provision of a medium-voltage power connection involves specific problems resulting from the fact that the amounts of current to be carried may reach tens of thousands of amps. In order that such currents may be carried under technically and economically acceptable conditions, the following considerations are of importance:

to reduce inductive losses in the connection;
to increase the capacity between conductors;
to provide for removal of the heat given off as a result of inevitable losses;
to reduce as far as possible the weight of metal required.

Preferably there is provided an electrical connecting device comprising a plurality of substantially cylindrical conductors coaxially arranged with insulation therebetween, the diameter of the outer conductor being less than twice the diameter of the inner conductor.

It has transpired in surprising fashion that coupling arrangements embodying a device, or preferably a plurality of serially-connected devices, as specified in the foregoing paragraph have satisfied simultaneously all the requirements mentioned above, and to an increasing degree as the amounts of current to be carried increase.

It can in fact be shown first of all that the reactive power lost in a coaxial connection of the kind now contemplated is proportional to the logarithm of the ratio of the outer and inner conductors. Choice of a value of less than two for this ratio locates matters in a region in which inductive losses decrease rapidly with the value of the said ratio.

At the same time, the mutually facing surfaces of the conductors are comparatively enlarged and the relative spacing between these surfaces is reduced, so that the capacity between conductors is increased.

These two effects combine to yield a noteworthy improvement in the power factor (cos $\Phi$) of the coupling arrangement. Another advantage obtained results from the fact that the skin effect is considerably reduced with the reduction in the thickness/diameter ratio of the conductors which can be achieved. The consequence of this is an appreciable saving in the weight of metal for a given amount of current and a given degree of heating.

The proposed structure moreover favors the natural possibilities of cooling in the radial direction. The transverse dimensions of the coupling arrangement are so determined that the temperature at the hottest point (generally situated on the inner conductor) does not exceed the limit set as a function of the properties of the metal used, which limit may be of the order of 100° C. for aluminum for example.

This naturally leads to an increase in the inner conductor diameter with the amount of current, and this increase yields a gain in efficiency in the structure proposed by the invention for the reasons set out above.

This is in contrast with present conventional structures, in which the increases in dimensions dictated by increases in the amount of current involve on the contrary a loss of efficiency.

The coaxial structure moreover exhibits the advantage of having practically no external magnetic field, so that even if there is a short circuit the electrodynamic forces combine to produce a practically zero resultant.

Another very important advantage is attained in practice with respect to the aforementioned connections of the so-called "coaxial" or "short circuit" type: because individual return sheaths are eliminated, losses are substantially reduced to those produced by the resistive heating effect in the conductors themselves. It may be anticipated that the coupling arrangements embodying the invention will yield a reduction in losses of 30 to 40 percent with respect to present sheathed connections of the "short circuit" type.

According to a preferred feature of the invention, the coaxial assembly of conductors is located in a common restraining enclosure comprising a sheath disposed outside the outer conductor and, if appropriate, an inner sheath. The or each sheath is separated from its adjacent conductors by insulation.

The restraining enclosure thus constituted has no electrical function strictly speaking, it has a purely mechanical and protective restraining function.

Preferably, the insulation between conductors and between conductors and sheaths is provided by a fluid insulant in conjunction with solid insulating members which act as spacers.

In this case, the insulating fluid also serves to remove the heat dissipated in the conductors, above all by convection, the heat leaving mainly by way of the external restraining sheath.

The surfaces of the spacers provide leakage paths and preferably in order that the spacer members may withstand voltages comparable with those sustainable by the fluid insulant, the spacer surfaces are corrugated to provide leakage paths which are longer than the actual separation of the conductors between which the spacer members extend.

This arrangement enables the spacing between conductors to be reduced toward the minimum value dictated by the working voltage and the insulant used, and the capacity between conductors to be increased.

In order that the invention and the manner of putting it into practice may be better understood, reference will now be made to the accompanying drawings in which:

FIG. 1 is a simplified diagrammatic view of an alternator and transformer connected by a coupling arrangement embodying the invention;

FIG. 2 is a view in cross section in the plane II–II in FIG. 1;

FIG. 3 is a corresponding view in longitudinal section;

FIG. 5 is a view in cross section of an expansion joint between sections of the coupling arrangement;

FIG. 6 is a partial view in elevation of the joint of FIG. 5;

FIG. 7 is a corresponding detail profile view of the inner conductor;

FIG. 8 is a similar view of the outer conductor;

FIG. 11 is a sectional view of the end portions of the coupling arrangement.

With reference to FIG. 1, it will be seen that the connection between the terminals of a three-phase alternator 1 and a transformer 2 comprises a coupling arrangement entirely restrained inside a cylindrical sheath 10 along which there are disposed at intervals, a series of diametrically opposed pairs of access apertures 11 and 12, distributed face-to-face along the upper and lower generators respectively of the sheath. The coupling arrangement comprises a series of serially joined connecting sections as will appear more fully hereinafter.

Figure 9:
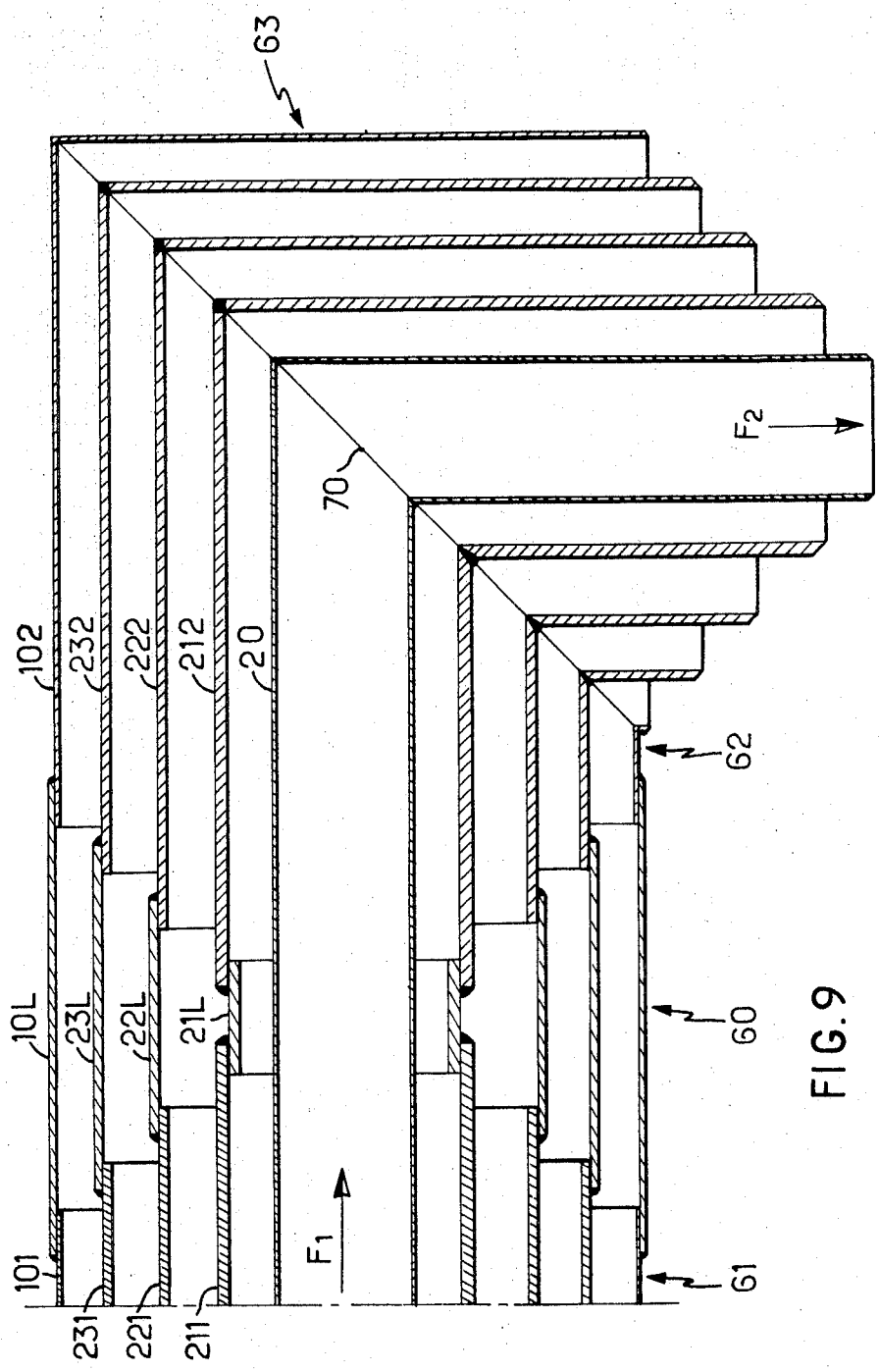
FIG. 9 is a sectional view of an elbow section.
Figure 10:
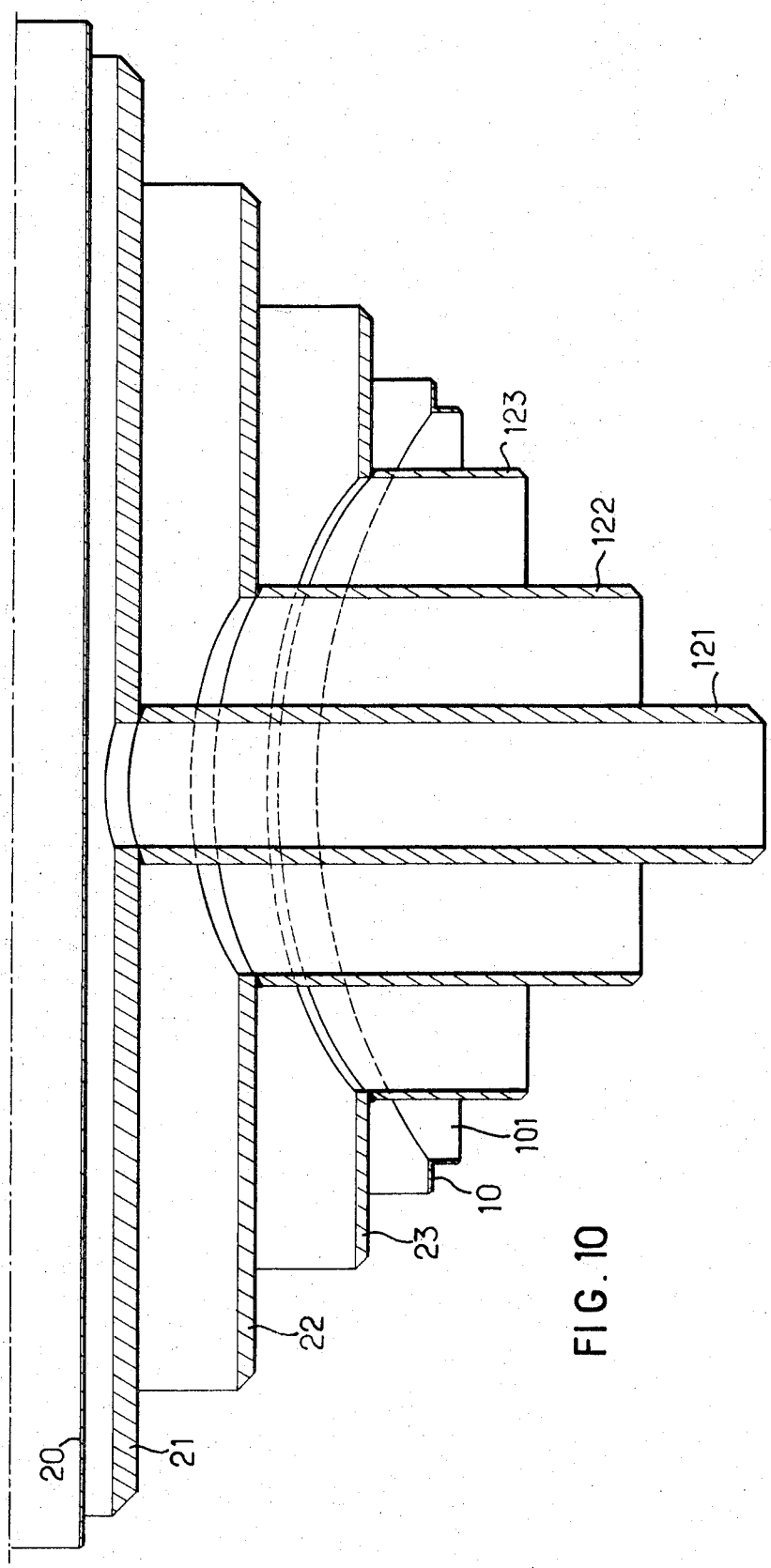
FIG. 10 is a sectional view of a tapped section providing a T-junction.

At the output of the alternator there is an end section 13 of the coupling arrangement and at the terminals giving access to the primary winding of the transformer 2 there is a similar end section 14; the coupling arrangement may comprise elbow sections and tapped sections not illustrated in FIG. 1; these special parts will form the subject of a particular description with reference to FIGS. 9 to 11.

Figure 4:
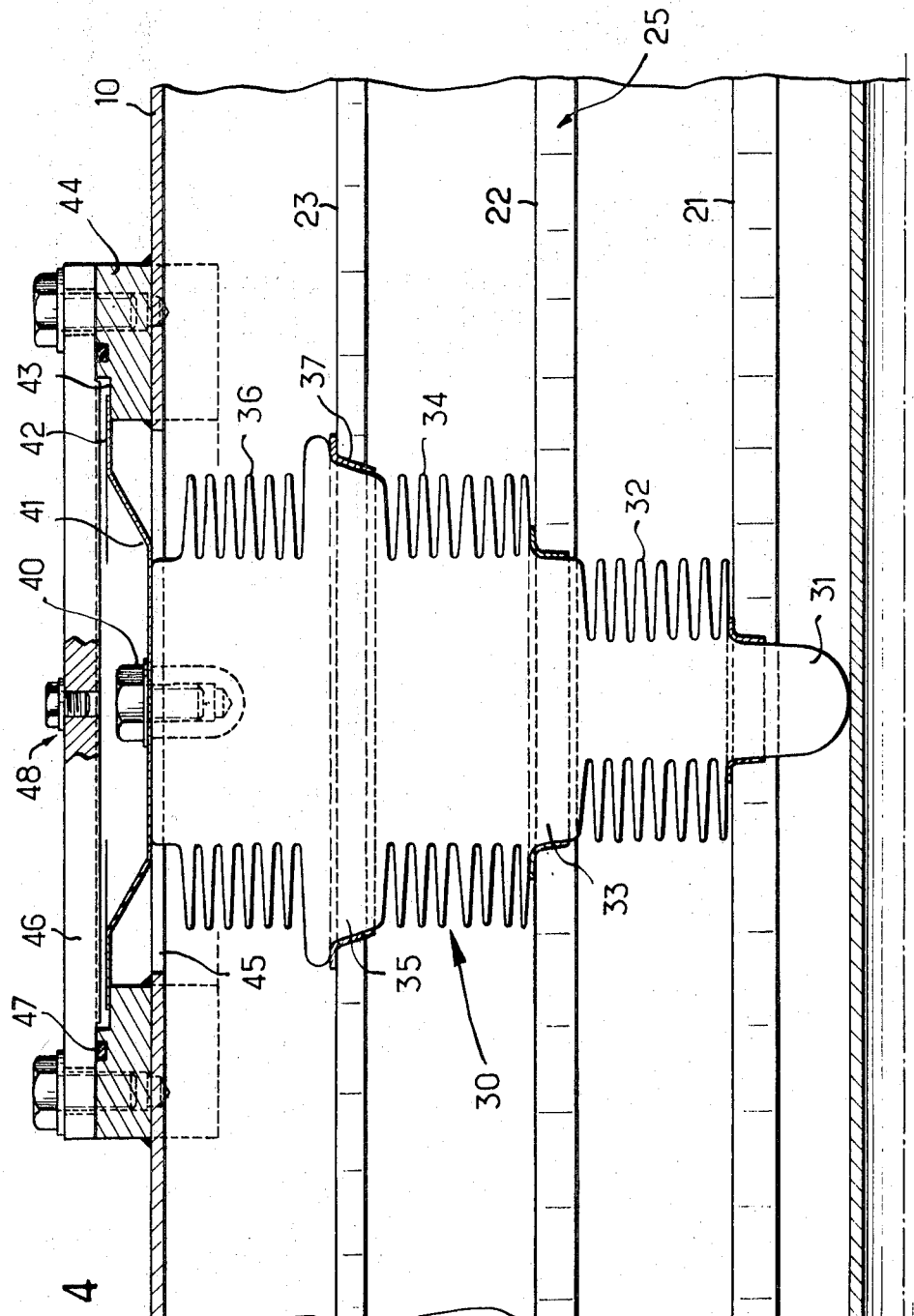
FIG. 4 is an enlargement of part of FIG. 3 showing more details.

With reference first of all to FIGS. 2 to 4, it will be seen that the structure of the coupling arrangement comprises, starting from the inside, an inner restraining sheath 20, an inner conductor 21 carrying on its internal face a certain number of small radial spacers 24, a middle conductor 22 and an outer conductor 23, all the conductors being substantially in the form of circular hollow cylinders. Generally, for convenience, the coupling arrangement will be divided in the longitudinal direction into sections of appropriate lengths as indicated above; in each of these sections, each of the conductors is made up by arranging two substantially semicylindrical shells such as 22A and 22B face-to-face, leaving between them at the top and bottom edges, two parallel slots such as 25: the longitudinal gaps thus formed expose increasing widths of the inner conductor to the outer conductor, and the two shells in each section are joined to one another by means of bridges such as 26 welded at various places along these gaps.

The shells intended to make up the conductors are advantageously made of rolled sheet, and the sheets used for this purpose will generally be between about 3 and 14 millimetres thick. There is no advantage in exceeding a limit of about 15 millimetres; it is advantageous to obtain the increase in conductor cross section which may be necessary by increasing the diameters of the conductors for the reason set out above.

Each of the sections of the coupling arrangement is equipped with at least one pair of diametrically opposed insulating members 30 which serve as spacers between the conductors and the conductors and sheaths. Each of these members comprises, from inside to outside (FIG. 4) a tongue 31 engaging in the slot in the inner conductor 21, a first portion 32 having a corrugated surface and constituting spacer lug between the inner and middle conductors, a portion providing a smooth bearing surface 33 slightly smaller in diameter than the width of the slot 25 in the middle conductor, a second spacer portion 34 for insulating the middle and outer conductors 22 and 23, this portion having an external diameter greater than the diameter of the first spacer portion 32, a portion providing a second smooth bearing surface 35 slightly smaller in diameter than the width of the slots in the outer conductor 23 and an outer spacer portion 36 for insulating the outer conductor 23 from the outer sheath 10, which latter portion 36 may have a diameter greater than or equal to the diameter of the stage 34. The smooth bearing surfaces 33, 35 and the tongue 31 are covered with contact rings such as 37, which rings are preferably slotted and elastic, and are intended to provide mechanical protection for the insulator by distributing over it the mechanical contact pressure of the adjacent edges of the associated shells.

Each of the insulating members 30 is fixed by means of screws 40 to a resilient plate 41, made for example of spring steel and stamped out in the shape of a dish, the edge 42 of the dish overlaps the periphery of an aperture 45 in the sheath 10 and is accommodated with play in a peripheral channel 43 provided for this purpose in a supporting frame 44 disposed round the aperture 45 which is of a diameter greater than the maximum diameter of the insulating member 30. The plate 41 blocks, though with play, the aperture 45 in the sheath. The frame 44 is adapted to receive a bolted-on cover 46 which blocks the aperture in fluidtight fashion by crushing a packing 47. Each of the covers 46 comprises a vent orifice 48 arranged to receive a removable stopper (shown in position in the drawing).

Since the insulating member 30 narrows toward the inner end (i.e. tongue 31) it can be removed through aperture 45 in sheath 10.

The coupling arrangement is constructed by assembling the desired number of sections of this design end-to-end. At least one expansion joint may be provided on the power transmission line thus formed in order to absorb expansion resulting from variations in temperature. Such a joint is made (FIGS. 5 to 8) by arranging two successive sections facing one another and spaced apart, and joining them by a group of flexible connecting elements. In the preferred embodiment illustrated in FIG. 6, a circular row of notches 53 is hollowed out in the end portions of each conductor represented here by conductor portions 51, 52, and between each pair of notches thus facing one another is fitted a flexible connecting element 54 taking the form for example of a plate of a dozen strips of 5/10 mm. aluminum foil welded to the bottom of the notches as indicated at 55, 56.

For the sake of standardization, the transverse dimension of all these connecting elements is made equal to the thickness of the inner conductor 21 (FIG. 7). As may be seen in FIG. 8, the height of the connecting elements thus exceeds the thickness of the outer conductor 23 for example, which will generally be less than that of the inner conductor 21 if the conductors are so made as to exhibit substantially equal conductive cross sections.

Other sections are joined together as follows: With reference first of all to the left-hand portion of FIG. 9, consideration will be given to the junction zone 60 of two successive sections 61, 62 of the coupling arrangement. Two successive sections such as 211 and 212 of the inner conductor 21 are aligned, but spaced apart, and are joined by a connecting cylindrical section 21L which overlaps the end portions of the conductor sections 211 and 212 and is a close fit therewith. Connecting section 21L may be made up of two or four shells in the shape of arcs of a circle. After the edges thus disposed towards one another have been welded to the connecting section 21L, the section 222 of the middle conductor is brought up to face the already fitted section 221 but spaced apart therefrom. The gap is bridged by a cylindrical connecting section 22L overlapping and fitting to the end portions of conductor sections 221 and 222. The same procedure is carried out in order to fix the connection 23L between the sections 231 and 232 of the outer conductor and the connecting section 10L between the successive sections 101 and 102 of the sheath. Proceeding thus from inside to outside, welding of the connecting section 21L may be followed by that of the section 22L and so forth. The gaps between corresponding conductors, and hence the lengths of the connecting cylinders, are progressively larger from inside to outside, the sheath 10 having a still larger gap between sections 101 and 102.

The right-hand portion of FIG. 9 shows the structure of an elbow; the section 62 is joined to another perpendicular section 63, on both sides of a plane 70 inclined for example at 45° with respect to the axis of one or other of the two parts 62, 63. The complete elbow section made up in this way is prefabricated in the workshop by successively assembling its metal elements by welds on the junction plane 70. When the coupling arrangement is being progressively fitted up in the direction of the arrow F1 for example, the last section already in place is fitted at the end with the elbow section 62, 63 by the method for making joints between two ordinary sections, and construction of the connection is then continued in the new direction F2 thus fixed.

FIG. 10 shows the structure of another type of special section, likewise prefabricated in the workshop, and adapted to constitute the takeoff point for a tap going to an auxiliary transformer for example. This section has its normal conductors 21, 22 and 23 which have together with sheath 10 a series of coaxial circular apertures to which are successively joined the tap conductors—inner 121, middle 122 and outer 123 coaxial with an axis at right angles to the axis of conductors 21, 22, 23, the apertures in the conductors and sheath providing access for the tap conductors. The same applies to the outer sheath 10, to which is joined the starting element 101 of the corresponding sheath of the tap. Construction of the tap is then continued by a method identical with that used in constructing the main line; there is generally no need to take a tap from the inner sheath 20.

Finally, FIG. 11 shows a preferred form of embodiment of the end portions 13, 14, which constitute the terminals joining the connection to the alternator on the one hand and to the output transformer on the other hand. Considering for example the right-hand portion of FIG. 11, it will be seen that the inner conductor 21 is blocked by an end-plate 210 facing an end-plate 200 which blocks the inner sheath 20. The connecting terminals 71 of the inner conductor are welded to the outside of the end-plate 210. A fluidtight closure stirrup 73, which serves as an abutment for an annular insulator 75, is moreover joined to the external wall of the end portion of the conductors 21. The flange 76 of this insulator may advantageously serve as a support for current transformers 77.

The connecting boss thus formed is aligned in a plane with two similar connecting bosses 80 and 90 provided for the middle conductor 22 and for the outer conductor 23 respectively and located on opposite sides of the boss of inner conductor 21. These lateral bosses are formed at the ends of end elbow portions 81 and 91 joined to the lateral walls of the associated conductors, this junction being made possible in the case of the middle conductor by the fact that the outer conductor 23 is cut off in beveled fashion to expose a part of the middle conductor 22, as is indicated at 230, which gives the necessary clearance in order to allow an elbow 81 access to the said middle conductor 22. The protective sheath 10 is extended round the elbows 81, 91 by way of the elbow sections 82, 92 terminating respectively at stirrups 83 and 93 which bear against insulators 85, 95 of the same kind as the insulator 75.

When the connection has been made from one end to the other, it is filled with a suitable insulating liquid (oil, liquid Araldite, Pyralene, etc...). Occluded air may be allowed to escape and filling may be checked by opening at least one of the vent orifices 48 in the upper covers of the coupling arrangement.

The corrugated profile of the insulating and spacing portions 32, 34, 36 of members 30 is so determined that the leakage paths along these portions are elongated to a sufficient extent (longer than the separation between the associated adjacent conductors) to enable the insulator to withstand a voltage comparable with the voltage sustainable by the layer of insulation fluid between these conductors. The electric field may be of the order of 200 kilovolts per centimeter in the case of the usual liquid dielectrics. Heat is removed here chiefly by convection from the outer sheath 10, the insulating liquid being able to circulate freely through the slots in the conductors in order to come into contact with the said sheath.

Various modifications of the above described coupling arrangement are possible. In the first place, it is possible to simplify the structure when moderate voltages are involved by simply using air as the insulating fluid. In this case, the inner sheath 20 will naturally be omitted.

In embodiments of this nature, a dark mat paint is usually applied to both sides of the pieces of sheet metal used in making the sheath and conductors in order to provide thermal coupling by radiation between conductors and sheaths. A sheath treated with dark red for example is capable of removing about 3.5 times more calories than a smooth bright sheath. Thermal coupling by radiation moreover enables the temperature difference between conductors to be reduced to a few degrees.

In the case of moderate powers, consideration may be given to the use of solid insulators, the energy dissipated then being removed essentially by conduction.

In the contrary case of large amounts of power to be dissipated, forced circulation may naturally be provided for the insulating fluid as in the case of transformers, with the addition of external heat exchangers.

The insulating members 30 could be embodied in the form of pillars made by stacking a series of separate parts, the essential advantage of the arrangement described remaining the possibility of removing and checking the insulators and replacing them when required.

I claim:

1. An electric coupling device for carrying large amounts of current at medium voltages, comprising: a plurality of coaxially arranged cylindrical conductors, at least two apertures provided in each of the conductors forming at least two groups of radially aligned apertures, at least one radially oriented insulating member extending through each of the groups of radially aligned apertures, each insulating member including bearing portions for engaging portions of the conductors adjacent to the apertures for maintaining the conductors in spaced-apart relationship.

2. A device as claimed in claim 1, wherein each of the cylindrical conductors comprises two semicylindrical portions, forming said apertures as longitudinal spaces therebetween.

3. A device as claimed in claim 2, further comprising bridging portions extending across the spaces between the semicylindrical portions to join together said two shells of each conductor.

4. A device as claimed in claim 2, wherein said semicylindrical shells are of rolled sheet metal and have a thickness less than 15 millimetres.

5. A device as claimed in claim 1, wherein each of the insulating members engages an inner restraining sheath which is coaxially disposed within the innermost conductor, and wherein each of the insulating members is supported at its other end on an external sheath surrounding coaxially the outermost conductor.

6. A device as claimed in claim 5, further comprising a coating of dark mat paint on both sides of said conductors and sheaths to provide thermal coupling by radiation between said conductors and said sheaths.

7. A device as claimed in claim 5, further comprising a further plurality of coaxially arranged cylindrical conductors, the diameter of the further outermost conductor being less than twice the diameter of the further innermost conductor, at least two further apertures provided in each of the further conductors forming at least two further groups of radially aligned apertures, at least one further radially oriented insulating member extending through each of the further groups of radially aligned apertures, each further insulating member including further bearing portions for engaging portions of the further conductors adjacent to the further associated apertures for maintaining the further conductors in spaced-apart relationship and a further external sheath arranged coaxially round the outermost conductor on which the further insulating members are supported, the conductors in the further plurality being equal in number to the number of conductors in the first-mentioned plurality and being coaxial about an axis at an angle to the axis of the first-mentioned conductors, the first-mentioned external sheath and outermost conductor and any conductor between the latter and the first-mentioned innermost conductor being apertured to provide access for connecting said further plurality of conductors to said first-mentioned plurality of conductors whereby the further plurality of conductors provide a tap from said first-mentioned plurality of conductors, and the two external sheaths being connected together.

8. A device as claimed in claim 1, wherein the cross section of each insulator narrows towards the axis of the conductors, and wherein the bearing surfaces are arranged as stepped shoulders of diminishing cross section so that each insulating member may be withdrawn by moving it radially outwardly through its respective group of apertures.

9. A device as claimed in claim 8, further comprising a resilient member attached to the radially outer end of each insulating member, said resilient member being accommodated with play to overlap the outer surface of said sheath around the margin of the aperture therein through which the associated insulating member is withdrawable, each resilient member blocking with play the associated aperture in said sheath.

10. A device as claimed in claim 1, wherein the groups of apertures are arranged in opposed pairs along diameters of the conductors disposed in a common plane.

11. A device as claimed in claim 1, comprising a further plurality of coaxially disposed cylindrical conductors, at least two apertures being provided in each of the further conductors forming two further groups of radially aligned apertures, a radially oriented insulator extending through each of the further groups of radially aligned apertures, and including bearing portions for engaging portions of the conductors adjacent to the apertures for maintaining the conductors in spaced-apart relationship, said further plurality of conductors being adjacent to the first-mentioned plurality of conductors and connected thereto by joining means individually connecting each conductor of said first-mentioned plurality to the corresponding conductor of said further plurality.

12. A device as claimed in claim 11, wherein said joining means comprises a plurality of substantially cylindrical conductors each overlapping and being welded to adjacent end portions of a respective pair of corresponding conductors of the two pluralities of conductors.

13. A device as claimed in claim 12 wherein adjacent end portions of the conductors of said connecting sections are spaced apart to define gaps therebetween, the gaps being larger, the greater the diameter of the corresponding conductors of said connecting sections, and said cylindrical joining conductors bridging said gaps.

14. A device as claimed in claim 13 wherein each of said cylindrical joining conductors is formed of two semicylindrical pieces.

15. A device as claimed in claim 11, wherein the apertures are disposed to form a space for circulating coolant in the conductors.

16. A device as claimed in claim 11, wherein said joining means comprises flexible conductors connecting the respective corresponding conductors of the two pluralities of conductors to allow for expansion of said conductors.

17. A device as claimed in claim 11, wherein each plurality of conductors consists of three conductors, and further comprising at each end section of the coupling arrangement a first connecting boss connected at the end of the inner one of said three conductors, a second connecting boss to one side of said first boss and connected by an elbow joint to the outer one of said three conductors, and a third connecting boss on the other side of said first boss and connected by an elbow joint to the middle one of said three conductors, said outer conductor being shaped to expose a portion of said middle conductor and allow connection of the associated elbow joint thereto.

18. A device as claimed in claim 1, wherein at least one pair of insulating members are provided in radially opposed relationship with respect to the axis of said conductors.

19. A device as claimed in claim 18, wherein each insulating member has corrugated surfaces to provide leakage paths between adjacent conductors which are longer than the distances therebetween.

20. A device as claimed in claim 1, wherein said innermost conductor is in the form of a hollow cylinder.

21. An electrical power installation comprising two pieces of electrical apparatus between which electrical power is to be transferred, a coupling arrangement connecting said two pieces of apparatus to transfer such power, said coupling arrangement comprising a plurality of coaxially arranged cylindrical conductors, at least two apertures provided in each of the conductors forming two groups of radially aligned apertures, at least one radially oriented insulating member extending through each of the groups of radially aligned apertures, each insulating member including bearing portions for engaging portions of the conductors adjacent to the associated apertures for maintaining the conductors in spaced-apart relationship.

22. An electric coupling device for carrying large amounts of current at medium voltages comprising a plurality of coaxially arranged cylindrical conductors, the diameter of the outermost conductor being less than twice the diameter of the innermost conductor, at least two apertures being provided in each of the conductors forming two groups of radially aligned apertures, a radially oriented insulating member extending through each of the groups of radially aligned apertures and having bearing surfaces for engaging portions of the conductors adjacent to the apertures for maintaining the conductors in spaced-apart relationship.

23. A device as claimed in claim 22, wherein the apertures are disposed to form a space for circulating coolant in the conductors.

24. A device as claimed in claim 23, wherein a liquid coolant is provided between the conductors.

25. A device as claimed in claim 15, wherein air is provided between the conductors and acts as the coolant.